(12) United States Patent
Blundell et al.

(10) Patent No.: US 10,997,472 B2
(45) Date of Patent: May 4, 2021

(54) CLASSIFYING INPUT EXAMPLES USING A COMPARISON SET

(71) Applicant: DEEPMIND TECHNOLOGIES LIMITED, London (GB)

(72) Inventors: Charles Blundell, London (GB); Oriol Vinyals, London (GB)

(73) Assignee: DeepMind Technologies Limited, London (GB)

(*) Notice: Subject to any disclaimer, the term of this patent is extended or adjusted under 35 U.S.C. 154(b) by 240 days.

(21) Appl. No.: 16/303,510

(22) PCT Filed: May 19, 2017

(86) PCT No.: PCT/US2017/033604
§ 371 (c)(1),
(2) Date: Nov. 20, 2018

(87) PCT Pub. No.: WO2017/201444
PCT Pub. Date: Nov. 23, 2017

(65) Prior Publication Data
US 2020/0327359 A1    Oct. 15, 2020

Related U.S. Application Data

(60) Provisional application No. 62/339,782, filed on May 20, 2016.

(51) Int. Cl.
*G06K 9/62* (2006.01)
*G06N 3/08* (2006.01)

(52) U.S. Cl.
CPC ........... *G06K 9/627* (2013.01); *G06K 9/6202* (2013.01); *G06K 9/6215* (2013.01); *G06K 9/6262* (2013.01); *G06N 3/08* (2013.01)

(58) Field of Classification Search
CPC ...... G06N 3/0445; G06N 3/0454; G06N 3/08; G06N 3/084; G06N 3/02; G06N 7/046;
(Continued)

(56) References Cited

U.S. PATENT DOCUMENTS

2015/0178383 A1    6/2015  Corrado et al.
2016/0140435 A1    5/2016  Bengio et al.

OTHER PUBLICATIONS

KR Notice of Allowance in Korean Appln. No. 10-2018-7035966, dated Jul. 21, 2020, 3 pages (with English translation).
(Continued)

*Primary Examiner* — Charlotte M Baker
(74) *Attorney, Agent, or Firm* — Fish & Richardson P.C.

(57) ABSTRACT

Methods, systems, and apparatus for classifying a new example using a comparison set of comparison examples. One method includes maintaining a comparison set, the comparison set including comparison examples and a respective label vector for each of the comparison examples, each label vector including a respective score for each label in a predetermined set of labels; receiving a new example; determining a respective attention weight for each comparison example by applying a neural network attention mechanism to the new example and to the comparison examples; and generating a respective label score for each label in the predetermined set of labels from, for each of the comparison examples, the respective attention weight for the comparison example and the respective label vector for the comparison example, in which the respective label score for each of the labels represents a likelihood that the label is a correct label for the new example.

20 Claims, 4 Drawing Sheets

(58) Field of Classification Search
CPC ....... G10L 15/16; G06T 3/4046; G06T 9/002; G06T 2207/20084; G06K 7/1482; H03H 2017/0208; H03H 2222/04
USPC ........ 382/156, 115, 117, 118, 155, 157, 158, 382/159, 160, 161, 224, 225, 226, 227, 382/228; 707/740
See application file for complete search history.

(56) References Cited

OTHER PUBLICATIONS

Atkeson et al. "Locally weighted learning," Artificial Intelligence Review, 11.1-5, Feb. 1997, 26 pages.
Bandanau et al. "Neural machine translation by jointly learning to align and translate," arXiv 1409.0473v7, May 19, 2016, 15 pages.
Donahue et al. "Decaf: A deep convolutional activation feature for generic visual recognition," ICML, Jan. 2014, 9 pages.
Graves et al. "Neural turing machines," arXiv 1410.5401v2, Dec. 10, 2014, 26 pages.
Hermann et al. "Teaching machines to read and comprehend," NIPS Dec. 2015, 9 pages.
Hill et al. "The goldilocks principle: Reading children's books with explicit memory representations," arXiv 1511.02301v4, Apr. 1, 2016, 13 pages.
Hinton et al. "Deep neural networks for acoustic modeling in speech recognition: The shared views of four research groups," IEEE Signal Processing Magazine 29(6), Nov. 2012, 16 pages.
Hochreiter et al. "Long short-term memory," Neural Computation 9(8), Nov. 1997, 32 pages.
Hoffer et al. "Deep metric learning using triplet network," Similarity-Based Pattern Recognition, arXiv 1412.6622v3, Mar. 23, 2015, 8 pages.
Ioffe et al. "Batch normalization: Accelerating deep network training by reducing internal covanate shift," arXiv 1502.03167v3, Mar. 2, 2015, 11 pages.
Koch et al. "Siamese Neural Networks for One-shot Image Recognition," ICML Deep Learning Workshop, Jul. 10, 2015, 8 pages.
Krizhevsky et al. "Convolutional deep belief networks on cifar-10," Unpublished manuscript 40(7), Aug. 2010, 9 pages.
Krizhevsky et al. "Imagenet classification with deep convolutional neural networks," NIPS, Dec. 2012, 9 pages.
Lake et al. "One shot learning of simple visual concepts," Proceeding of the Annual Meeting of the Cognitive Science Society, 33(33), Jan. 2011, 7 pages.
Marcus et al. "Building a large annotated corpus of English: the penn treebank," Computational Linguistics 19(2), Oct. 1993, 25 pages.
Mikolov et al. "Recurrent neural network based language model," Interspeech, Jul. 2010, [retrieved on Nov. 28, 2018] Retrieved from Internet: URL< http://www.fit.vutbr.cz/research/groups/speech/servite/2010/rnnlm_mikolov.pdf > 24 pages [Presentation].
Norouzi et al. "Zero-shot learning by convex combination of semantic embeddings," arXiv 1312.5650v3, Mar. 21, 2014, 9 pages.
PCT International Preliminary Report on Patentability issued in International Application No. PCT/US2017/033604, dated Oct. 11, 2018, 15 pages.
PCT International Search Report and Written Opinion issued in International Application No. PCT/US2017/033604, dated Sep. 11, 2017, 13 pages.
PCT Written Opinion issued in International Application No. PCT/US2017/033604, dated Jun. 12, 2018, 7 pages.
Roweis et al. "Neighborhood component analysis," NIPS, Dec. 2004, 8 pages.
Russakovsky et al. "ImageNet Large Scale Visual Recognition Challenge," arXiv 1409.0575v3, Jan. 30, 2015, 43 pages.
Salakhutdinov et al. "Learning a nonlinear embedding by preserving class neighborhood structure," AISTATS, Mar. 2007, 8 pages.
Santoro et al. "Meta-learning with memory-augmented neural networks," ICML, Jun. 2016, 9 pages.
Simonyan et al. "Very deep convolutional networks for large-scale image recognition," arXiv 1409.1556v6, Apr. 10, 2015, 14 pages.
Sutskever et al. "Sequence to sequence learning with neural networks," NIPS Dec. 2014, 9 pages.
Szegedy et al. "Going deeper with convolutions," CVPR, Jun. 2015, 9 pages.
Szegedy et al. "Rethinking the inception architecture for computer vision," arXiv 1512.00567v3, Dec. 11, 2015, 10 pages.
Vinyals et al. "Order matters: Sequence to sequence for sets," arXiv 1511.06391v4, Feb. 23, 2016, 11 pages.
Vinyals et al. "Pointer networks," NIPS, Dec. 2015, 9 pages.
Weinberger et al "Distance metric learning for large margin nearest neighbor classification," NIPS Dec. 2006, 8 pages.
Weston et al. "Memory networks," arXiv1410.3916v11, Nov. 29, 2015, 15 pages.
Zaremba et al. "Recurrent neural network regularization," arXiv 1409.2329v5, Feb. 19, 2015, 8 pages.
KR Office Action in Korean Appln. No. 10-2018-7035966, dated Feb. 27, 2020, 8 pages (with English translation).
EP Office Action in European Appln. No. 17728007.0, dated Oct. 26, 2020, 7 pages.
IN Office Action in Indian Appln. No. 201827043230, dated Jan. 18, 2021, 8 pages (with English translation).

CLASSIFYING INPUT EXAMPLES USING A COMPARISON SET

CROSS REFERENCE TO RELATED APPLICATIONS

This application is a National Stage Application under 35 U.S.C. § 371 and claims the benefit of International Application No. PCT/US2017/033604, filed May 19, 2017, which is a non-provisional of and claims priority to U.S. Provisional Patent Application No. 62/339,782, filed on May 20, 2016, the entire contents of which are hereby incorporated by reference.

BACKGROUND

This specification relates to classifying data using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step.

SUMMARY

This specification describes a system implemented as computer programs on one or more computers in one or more locations. The system is a system for classifying an input example using a comparison set of comparison examples.

One example aspect of the present disclosure is directed to a method performed by one or more computers for classifying a new example using a comparison set of comparison examples, the method comprising: maintaining a comparison set, the comparison set comprising a plurality of comparison examples and a respective label vector for each of the plurality of comparison examples, each label vector including a respective score for each label in a predetermined set of labels; receiving a new example; determining a respective attention weight for each comparison example by applying a neural network attention mechanism to the new example and to the comparison examples; and generating a respective label score for each label in the predetermined set of labels from, for each of the comparison examples, the respective attention weight for the comparison example and the respective label vector for the comparison example, wherein the respective label score for each of the labels represents a likelihood that the label is a correct label for the new example.

In an implementation of this aspect, the method may further comprise classifying the new example based on the respective label scores for the labels in the predetermined set of labels. For example, the new example may be classified using a classification derived from the label scores. As further examples, the new example may be classified using/ based on the label with the highest likelihood of being correct, or it may be classified using/based on then (n>1) labels with the highest likelihood of being correct, or it may be classified using/based on all labels with a likelihood of being correct that exceeds a threshold, etc.

Another example aspect of the present disclosure is directed to a method performed by one or more computers for controlling an agent in an environment. The method comprises generating one or more control inputs for controlling the agent based on an output of a method of the first aspect (for example based on generated label scores, or based on a classification derived from generated label scores).

The subject matter described in this specification can be implemented in particular embodiments so as to realize one or more of the following advantages. A data classification system including a neural network can effectively determine labels for unobserved classes without requiring any changes to the neural network or re-training the neural network from scratch. In particular, the neural network can take a new set of labeled examples as its input, as well as a new input example that needs to be classified, and can effectively classify the new input example using the new set of labeled examples even though the new set of labeled examples are different from a set of labeled examples that was previously used to train the neural network. Embodiments of the subject matter may therefore provide neural networks that may be trained to process input data (for example image data) to generate output data indicating a property associated with the image data in a more effective manner.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAIL DESCRIPTION

This specification generally describes a data classification system that is configured to classify any of a variety of data, i.e., any kind of data object that can be classified as belonging to one or more categories.

For example, if the input data is images, the data classification system may be a visual recognition system that determines whether an input image includes images of objects that belong to object categories from a predetermined set of object categories. As another example, if the input data is videos or portions of videos, the data classification system may be a video classification system that determines what topic or topics an input video or video portion relates to. As another example, if the input data is audio data, the data classification system may be a speech recognition system that determines, for a given spoken utterance, the term or terms that the utterance represents. As another example, if the input data is text data, the data classification system may be a text classification system that determines what topic or topics an input text segment relates to.

Figure 1:
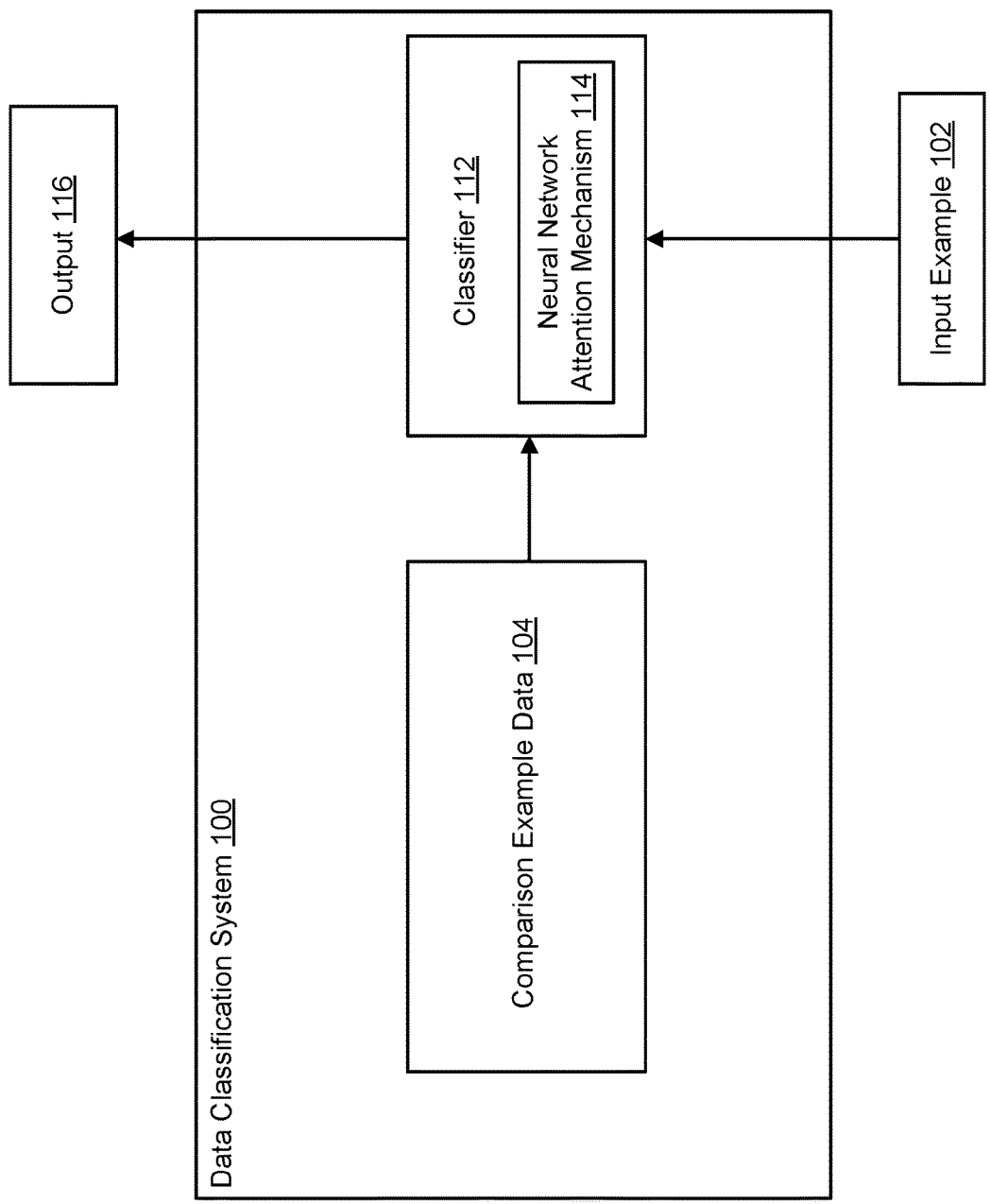
FIG. 1 shows an example data classification system.

FIG. 1 shows an example data classification system 100.

The data classification system 100 is an example of a system implemented as computer programs on one or more computers in one or more locations in which the systems, components, and techniques described below are implemented.

The data classification system 100 is configured to receive an input example 102 and to generate an output 116 that classifies the input example 102, e.g., determines a category which the input example 102 belongs to or a topic that the input example 102 relates to.

The data classification system 100 stores comparison example data 104 that includes a comparison set. The comparison set includes a number of comparison examples and a respective label vector for each of the comparison examples. Each label vector includes a respective score for each label in a predetermined set of labels. Generally, the label scores in a given label vector identify the known label or labels for the corresponding comparison example.

The data classification system 100 includes a classifier 112 that takes the comparison example data 104 and the input example 102 as inputs. The classifier 112 generates the output 116 as a function of the comparison example data and the input example 102 using a neural network attention mechanism 114. The process for generating the output 116 using the neural network attention mechanism 114 is described in more detail below with reference to FIG. 2 and FIG. 3.

An output 116 from the data classification system 100 may be used in many applications. As one example application, an output 116 from the data classification system 100 may be used in selection of one or more actions for control of an agent in an environment. For example, the output 116 of the data classification system 100 may be used as, or used to generate, one or more control inputs that provide control of the agent in the environment. The environment may be a real-world environment in which an object in the real-world environment is controlled. For example, the object/agent may be a vehicle, such as an autonomous ("self-driving") or partially-autonomous vehicle, and the output 116 of the data classification system 100 may be used as, or may be used to generate, control inputs to control the vehicle, for example to control navigation of the vehicle. Some aspects may therefore address problems associated with efficient and effective selection, based on input data, of actions for control of an agent.

Figure 2:
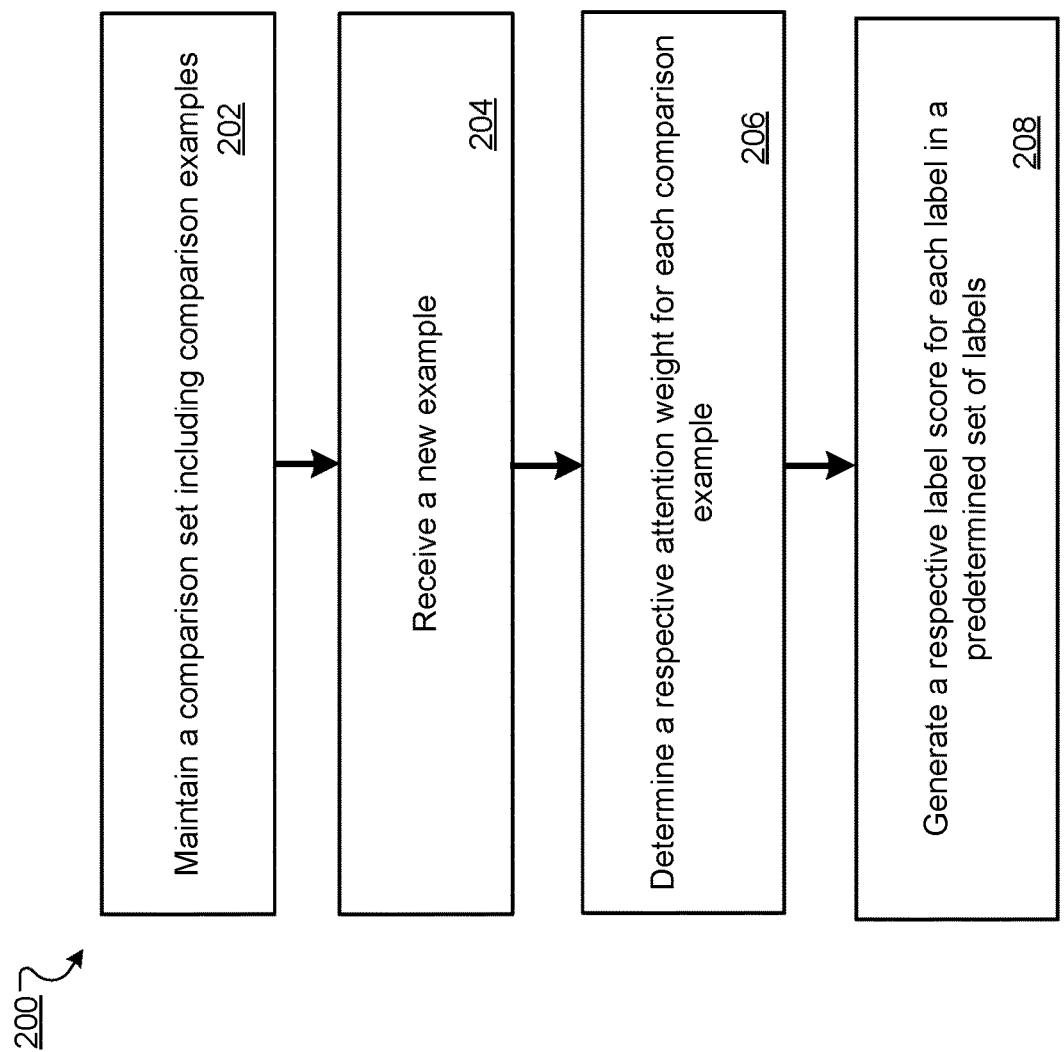
FIG. 2 is a flow diagram of an example process for classifying a new example using a comparison set of comparison examples.

FIG. 2 is a flow diagram of an example process 200 for classifying a new example using a comparison set of comparison examples. For convenience, the process 200 will be described as being performed by a system of one or more computers located in one or more locations. For example, a data classification system, e.g., the data classification system 100 of FIG. 1, appropriately programmed in accordance with this specification, can perform the process 200.

The system maintains a comparison set (step 202). As described above, the comparison set can include k comparison examples and can be denoted as:

$S=\{(x_i,y_i)\}_{i=1}^{k},$ where $x_i$ is an comparison example and $y_i$ is a respective label vector for the comparison example $x_i$. Each label vector $y_i$ includes a respective score for each label in a predetermined set of labels. The label scores in a given label vector generally identify the known label or labels for the corresponding comparison example.

In some cases, the comparison set can be different from a comparison set that was used to train the neural network. That is, the neural network can be used to classify a new example using a new set of comparison examples different from the set used to train the neural network without re-training the neural network. In some of these cases, the new set of comparison examples can include some comparison examples that were used in the training of the neural network and some additional or "unseen" comparison examples. In others of these cases, the new set of comparison examples can include only "unseen" comparison examples and no comparison examples that were used in the training.

The system receives a new example (step 204). The new example can be denoted as $\hat{x}$.

After receiving the new example, the system determines a respective attention weight for each comparison example by applying a neural network attention mechanism to the new example and to the comparison examples (step 206). The process for determining the respective attention weight for each comparison example is described in more detail below with reference to FIG. 3.

The system then generates, for the new example, a respective label score for each label in the predetermined set of labels so that the respective label score for each of the labels represents a likelihood that the label is the correct label for the new example (step 208). In particular, the system generates the label scores from, for each of the comparison examples, the respective attention weight for the comparison example and the scores in the respective label vector for the comparison example.

In some implementations, the label scores can be computed as follows:

$$\hat{y} = \sum_{i=1}^{k} a(\hat{x}, x_i) y_i, \qquad (1)$$

wherein $x_i$ is a comparison example and $y_i$ is the label vector for the comparison example from the comparison set $S=\{*x_i, y_i\}_{i=1}^{k}$, and $a(\hat{x}, x_i)$ is an attention weight for the comparison example $x_i$ given the new example $\hat{x}$.

Eq. 1 describes the output for the new example as a linear combination of the label vectors in the comparison set. For each comparison example $x_i$, the system multiplies the label vector $y_i$ for the comparison example $x_i$ by the attention weight $a(\hat{x}, x_i)$ for the comparison example $x_i$ to generate a weighted label vector $a(\hat{x}, x_i)y_i$ for the comparison example $x_i$. The system then sums all the weighted label vectors to generate a combined label vector $\hat{y}$ that includes a respective label score for each label in the predetermined set of labels. Each label score for each of the labels represents a likelihood that the label is a correct label for the new example.

In some implementations, the system may further classify the new example based on the respective label scores for the labels in the predetermined set of labels. For example, the new example may be classified using a classification derived from the label scores. As further examples, the new example may be classified using/based on the label with the highest likelihood of being correct, or it may be classified using/based on then (n>1) labels with the highest likelihood of being correct, or it may be classified using/based on all labels with a likelihood of being correct that exceeds a threshold.

After the new example has been classified, the system can provide the respective label scores for the labels in the predetermined set of labels, one or more labels with the highest likelihood of being correct, or both to another system for further processing. For example, the new example can be sensor data (e.g., an image) captured by sensor of an agent, and the other system can be a control system that makes decisions about how to control the agent in an environment using the received label scores, the one or more labels with the highest likelihood of being correct, or both.

Figure 3:
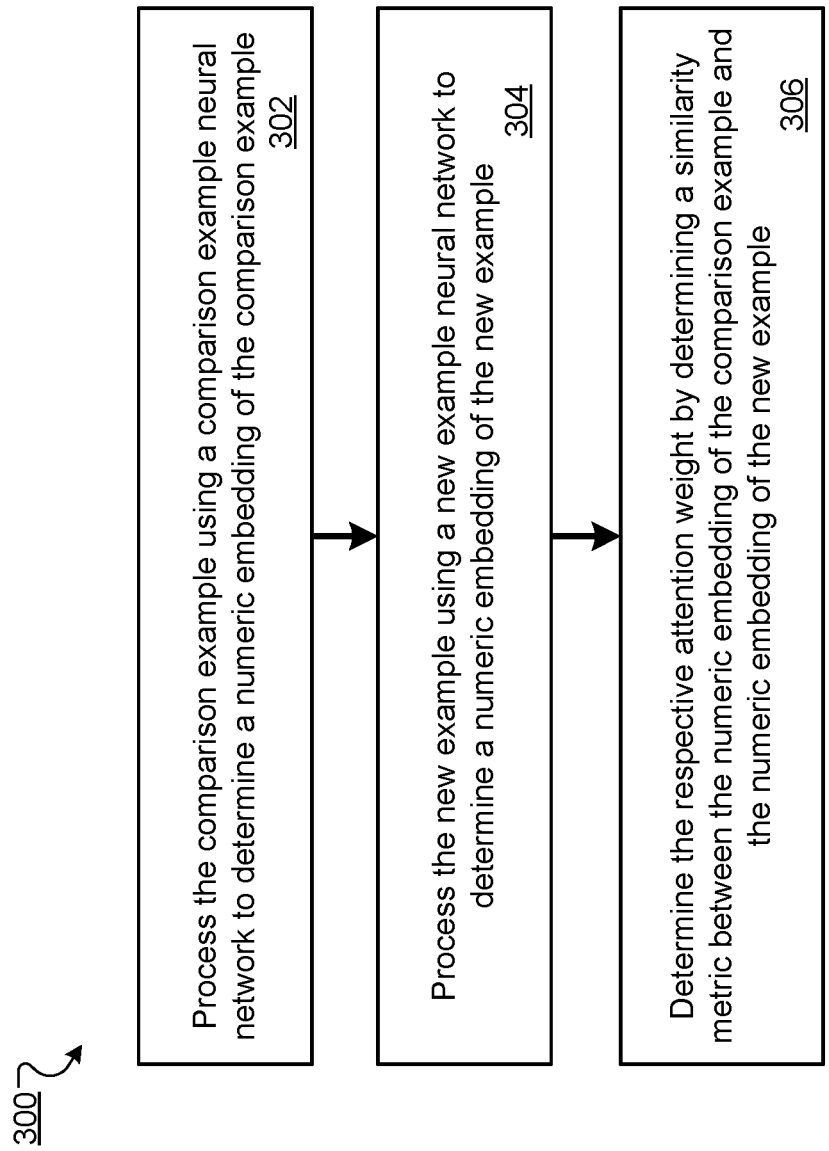
FIG. 3 is a flow diagram of an example process for determining a respective attention weight for each comparison example.

FIG. 3 is a flow diagram of an example process 300 for determining the respective attention weight for each comparison example using a neural network attention mechanism. For convenience, the process 300 will be described as being performed by a system of one or more computers located in one or more locations. For example, a data classification system, e.g., the data classification system 100 of FIG. 1, appropriately programmed in accordance with this specification, can perform the process 300.

The system processes the comparison example $x_i$ using a comparison example neural network $g(x_i)$ to determine a numeric embedding of the comparison example (step 302). Generally, a numeric embedding is an ordered collection of numeric values, e.g., a vector of floating point values or of quantized floating point values.

In some implementations, when the examples are images, the comparison example neural network $g(x_i)$ is a convolutional neural network configured to receive an input comparison example and to generate the embedding of the comparison example. In some other implementations, when the examples are words, phrases, or other text segments, the comparison example neural network is a text embedding neural network that embeds input text into a vector.

In some other implementations, the comparison example neural network $g(x_i)$ is a bidirectional Long-Short Term Memory (LSTM) neural network configured to process the comparison example in the context of a sequence of comparison examples from the comparison examples in the comparison set to generate the numeric embedding of the comparison example. That is, the system can arrange the comparison examples as a sequence, and for each comparison example, process the comparison example or a feature representation of the comparison example, e.g., as generated by a convolutional neural network or a text embedding neural network, using a bidirectional LSTM neural network according to the sequence to generate the numeric embedding of the comparison example.

The system processes the new example $\hat{x}$ using a new example neural network $f(\hat{x})$ to determine a numeric embedding of the new example (step 304). In some implementations, when the examples are images, the new example neural network $f(\hat{x})$ is a convolutional neural network configured to receive an input new example and to generate the embedding of the new example. In some other implementations, when the examples are words, phrases, or other text segments, the comparison example neural network is a text embedding neural network that embeds input text into a vector.

In some other implementations, the new example neural network $f(\hat{x})$ is an LSTM neural network with read attention over the numeric embeddings for the plurality of comparison examples that is configured to process a sequence including K instances of the new example or of a feature representation of the new example to generate the numeric embedding of the comparison example. The new example neural network $f(\hat{x})$ can be expressed as follows:

$$f(\hat{x},S)=attLSTM(f'(\hat{x}),g(S),K),$$

where f'(x) is the new example or the feature representation of the new example and g(S) is the set of numeric embeddings of the comparison examples. That it is, at each time step of the K steps other than the last time step, the system processes the feature representation of the new example using an LSTM neural network in accordance with a current internal state of the LSTM neural network to generate an initial update to the internal state. The system then combines, e.g., sums, the initial update and the feature representation to generate an embedding key and applies a content-based attention mechanism over the numeric embeddings for the comparison examples using the embedding key to generate an attention vector. The system then combines, e.g., concatenates, the initial update and the attention vector to generate the updated internal state, i.e., the internal state that will be used as the current internal state for the next time step. The system can then use the initial update or the embedding key for the last time step, i.e., the K-th step, as the final numeric embedding of the new example.

In some cases, when the new example neural network and the comparison example neural network both are or include a convolutional neural network, the new example neural network and the comparison example neural network share at least some parameters.

The system determines the respective attention weight by determining a similarity metric between the numeric embedding of the comparison example and the numeric embedding of the new example (step 306). In some implementations, the similarity metric is a cosine distance. In some implementations, the system computes the respective attention weight $a(\hat{x}, x_i)$ for each comparison example given the new example based on the following model:

$$a(\hat{x},x_i)=e^{c(f(\hat{x}),g(x_i))}/\sum_{j=1}^{k}e^{c(f(\hat{x}),g(x_j))}, \quad (2)$$

where $f(\hat{x})$ is the new example neural network that embeds new example $\hat{x}$, $g(x_i)$ is the comparison example neural network that embeds comparison example $x_i$, and c( ) is a cosine distance function.

Figure 4:
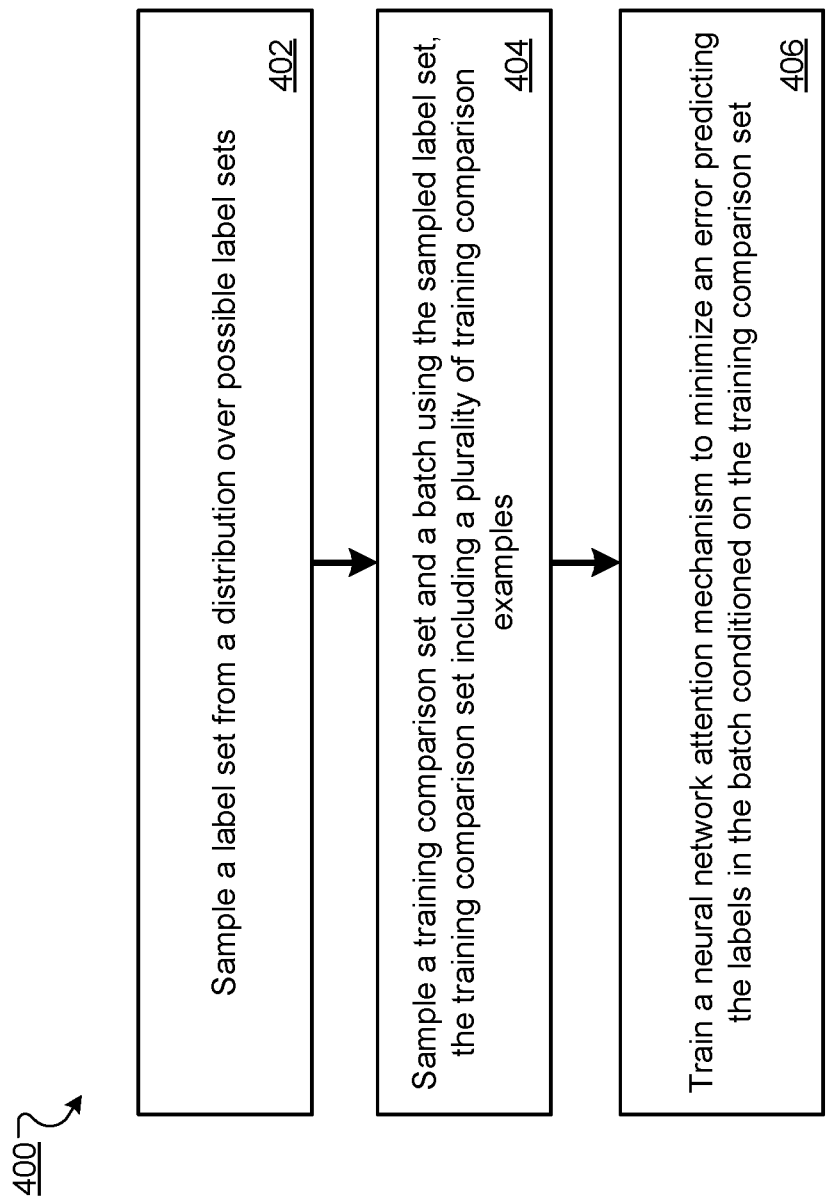
FIG. 4 is a flow diagram of an example process for training a neural network attention mechanism.

FIG. 4 is a flow diagram of an example process 400 for training a neural network attention mechanism.

For convenience, the process 400 will be described as being performed by a system of one or more computers located in one or more locations. For example, a data classification system, e.g., the data classification system 100 of FIG. 1, appropriately programmed in accordance with this specification, can perform the process 400 to train the neural network attention mechanism.

The system samples a label set from a distribution over possible label sets (step 402). Each label set is a different combination of labels from a complete set of possible labels. In some cases, each label set includes the same number of labels, e.g., two or three. In other cases, the different label sets include different numbers of labels, e.g., ranging from one or two to five labels. For example, the distribution can uniformly weight all of the possible label sets and the system can randomly sample the label set using the distribution The system then samples a training comparison set and a batch of input examples using the sampled label set (step 404). In particular, for each label in the sampled label set, the system samples a set of comparison examples having that label. The set of sampled comparison examples and their corresponding labels for all of the labels in the sampled label set form the training comparison set. The batch includes a random sequence of comparison examples that have one of the labels in the sampled labeled set.

The system trains a neural network attention mechanism to minimize an error predicting the labels for the examples in the batch conditioned on the training comparison set (step 406). In particular, the system trains the attention mechanism to adjust current values of the parameters of the attention mechanism to reduce the error using a conventional neural network training technique, e.g., a gradient descent-based training technique.

The system can repeatedly perform the process 400, i.e., by repeatedly sampling label sets and then training the neural network attention mechanism based on the sampled label set, to determine trained values of the parameters of the neural network attention mechanism. By training the neural network attention mechanism in this manner, the system can rapidly determine trained values of the parameters of the neural network attention mechanism that satisfy the training objective of reducing the error and the trained neural network can perform well even when the comparison set being used to classify an input example is different from any of the comparison sets used in training the neural network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A method performed by one or more computers for classifying a new image using a comparison set of comparison images, the method comprising:
   maintaining a comparison set, the comparison set comprising a plurality of comparison images and a respective label vector for each of the plurality of comparison images, each label vector including a respective score for each label in a predetermined set of labels;
   receiving a new image;
   determining, for each comparison image, a respective attention weight characterizing a level of similarity between the comparison image and the new image by applying a neural network attention mechanism to the new image and to the comparison image; and
   generating a respective label score for each label in the predetermined set of labels from, for each of the comparison images, the respective attention weight for the comparison image and the respective label vector for the comparison image, wherein the respective label score for each of the labels represents a likelihood that the label is a correct label for the new image,
   wherein generating the respective label score for each label in the predetermined set of labels comprises:
      for each comparison image, multiplying the label vector for the comparison image by the attention weight for the comparison image to generate a weighted label vector for the comparison image, and
      summing the weighted label vectors to generate a combined label vector that includes a respective label score for each label in the predetermined set of labels.

2. The method of claim 1, wherein the neural network attention mechanism has been learned by training on a training set of images different from the comparison set.

3. The method of claim 1, wherein determining the respective attention weight for each comparison image comprises:
   processing the comparison image using a comparison image neural network to determine a numeric embedding of the comparison image;
   processing the new image using a new image neural network to determine a numeric embedding of the new image; and
   determining the respective attention weight by determining a similarity metric between the numeric embedding of the comparison image and the numeric embedding of the new image.

4. The method of claim 3, wherein the similarity metric is a cosine distance.

5. The method of claim 3, wherein the comparison image neural network is a bidirectional Long-Short Term Memory (LSTM) neural network configured to process the comparison image in the context of a sequence of comparison images from the comparison images in the comparison set to generate the numeric embedding of the comparison image.

6. The method of claim 3, wherein the new image neural network is an LSTM neural network with read attention over the numeric embeddings for the plurality of comparison images that is configured to process a sequence comprising K instances of the new image to generate the numeric embedding of the comparison image.

7. The method of claim 3, wherein the comparison image neural network is a convolutional neural network configured to receive an input comparison image and to generate the embedding of the comparison image.

8. The method of claim 3, wherein the new image neural network is a convolutional neural network configured to receive an input new image and to generate the embedding of the new image.

9. The method of claim 3, wherein the new image neural network and the comparison image neural network share at least some parameters.

10. A system comprising one or more computers and one or more storage devices storing instructions that, when executed by the one or more computers, cause the one or more computers to perform operations for classifying a new image using a comparison set of comparison images, the operations comprising:
    maintaining a comparison set, the comparison set comprising a plurality of comparison images and a respective label vector for each of the plurality of comparison images, each label vector including a respective score for each label in a predetermined set of labels;
    receiving a new image;
    determining, for each comparison image, a respective attention weight characterizing a level of similarity between the comparison image and the new image by applying a neural network attention mechanism to the new image and to the comparison image; and
    generating a respective label score for each label in the predetermined set of labels from, for each of the comparison images, the respective attention weight for the comparison image and the respective label vector for the comparison image, wherein the respective label score for each of the labels represents a likelihood that the label is a correct label for the new image,
    wherein generating the respective label score for each label in the predetermined set of labels comprises:
        for each comparison image, multiplying the label vector for the comparison image by the attention weight for the comparison image to generate a weighted label vector for the comparison image, and
        summing the weighted label vectors to generate a combined label vector that includes a respective label score for each label in the predetermined set of labels.

11. The system of claim 10, wherein the neural network attention mechanism has been learned by training on a training set of images different from the comparison set.

12. A non-transitory computer storage medium encoded with instructions that, when executed by one or more computers, cause the one or more computers to perform operations for classifying a new image using a comparison set of comparison images, the operations comprising:
    maintaining a comparison set, the comparison set comprising a plurality of comparison images and a respective label vector for each of the plurality of comparison images, each label vector including a respective score for each label in a predetermined set of labels;
    receiving a new image;
    determining, for each comparison image, a respective attention weight characterizing a level of similarity between the comparison image and the new image by applying a neural network attention mechanism to the new image and to the comparison image; and
    generating a respective label score for each label in the predetermined set of labels from, for each of the comparison images, the respective attention weight for the comparison image and the respective label vector for the comparison image, wherein the respective label score for each of the labels represents a likelihood that the label is a correct label for the new image,
    wherein generating the respective label score for each label in the predetermined set of labels comprises:
        for each comparison image, multiplying the label vector for the comparison image by the attention weight for the comparison image to generate a weighted label vector for the comparison image, and
        summing the weighted label vectors to generate a combined label vector that includes a respective label score for each label in the predetermined set of labels.

13. The non-transitory computer storage medium of claim 12, wherein determining the respective attention weight for each comparison image comprises:
    processing the comparison image using a comparison image neural network to determine a numeric embedding of the comparison image;
    processing the new image using a new image neural network to determine a numeric embedding of the new image; and
    determining the respective attention weight by determining a similarity metric between the numeric embedding of the comparison image and the numeric embedding of the new image.

14. The system of claim 10, wherein determining the respective attention weight for each comparison image comprises:
    processing the comparison image using a comparison image neural network to determine a numeric embedding of the comparison image;
    processing the new image using a new image neural network to determine a numeric embedding of the new image; and
    determining the respective attention weight by determining a similarity metric between the numeric embedding of the comparison image and the numeric embedding of the new image.

15. The system of claim 14, wherein the similarity metric is a cosine distance.

16. The system of claim 14, wherein the comparison image neural network is a bidirectional Long-Short Term Memory (LSTM) neural network configured to process the comparison image in the context of a sequence of comparison images from the comparison images in the comparison set to generate the numeric embedding of the comparison image.

17. The system of claim 14, wherein the new image neural network is an LSTM neural network with read attention over the numeric embeddings for the plurality of comparison images that is configured to process a sequence comprising K instances of the new image to generate the numeric embedding of the comparison image.

18. The system of claim 14, wherein the comparison image neural network is a convolutional neural network configured to receive an input comparison image and to generate the embedding of the comparison image.

19. The system of claim 14, wherein the new image neural network is a convolutional neural network configured to receive an input new image and to generate the embedding of the new image.

20. The system of claim 14, wherein the new image neural network and the comparison image neural network share at least some parameters.

* * * * *